US006609212B1

(12) United States Patent
Smith

(10) Patent No.: US 6,609,212 B1
(45) Date of Patent: Aug. 19, 2003

(54) APPARATUS AND METHOD FOR SHARING PREDICTIVE FAILURE INFORMATION ON A COMPUTER NETWORK

(75) Inventor: Gordon James Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/522,127

(22) Filed: Mar. 9, 2000

(51) Int. Cl.[7] ................................................. H02H 3/05
(52) U.S. Cl. .......................................................... 714/4
(58) Field of Search ............................... 714/4, 39, 47, 714/48; 709/218, 224, 229, 213, 312

(56) References Cited

U.S. PATENT DOCUMENTS

| | | | | |
|---|---|---|---|---|
| 4,769,761 A | * | 9/1988 | Downes et al. | 709/224 |
| 5,226,037 A | * | 7/1993 | Satomi et al. | 370/220 |
| 5,283,905 A | | 2/1994 | Saadeh et al. | 713/324 |
| 5,637,241 A | | 6/1997 | Moates | 219/109 |
| 5,721,843 A | * | 2/1998 | Ganti et al. | 712/29 |
| 5,805,166 A | | 9/1998 | Hall, Jr. et al. | 345/839 |
| 5,848,073 A | * | 12/1998 | Abdelmonem et al. | 714/704 |
| 5,892,916 A | | 4/1999 | Gehlhaar et al. | 709/223 |
| 6,085,178 A | | 7/2000 | Bigus et al. | 705/80 |
| 6,249,883 B1 | * | 6/2001 | Cassidy et al. | 714/42 |
| 6,298,308 B1 | | 10/2001 | Reid et al. | 702/56 |
| 6,411,506 B1 | * | 6/2002 | Hipp et al. | 361/686 |
| 6,427,114 B1 | * | 7/2002 | Olsson | 701/117 |
| 6,446,123 B1 | * | 9/2002 | Ballantine et al. | 709/224 |

OTHER PUBLICATIONS

"The S.M.A.R.T. System and Data Reliability", www.quantum.com/src/whitepapers/wp_smart_toc.htm.
"Predictive Failure Analysis", http://ssdweb01.storage.ibm.com/oem/tech/pfa.htm.
"Predictive Failure Analysis—Advanced Condition Monitoring", http://ssdweb01.storage.ibm.com/oem/tech/predfail.htm.

* cited by examiner

Primary Examiner—Dieu-Minh Le
(74) Attorney, Agent, or Firm—Martin & Associates, LLC; Derek P. Martin

(57) ABSTRACT

An apparatus and method shares predictive failure information between computer systems in a computer network. The shared predictive failure information allows a requester of a network resource to determine whether the resource will be available to perform the request based on its predictive failure information. According to a first embodiment, predictive failure information is written by each computer system on the network to a common storage that is accessible by one or more other computer systems on the network. When a computer system on the network needs a resource on another system, the requesting computer system can check the predictive failure status of the system that contains the needed resource by reading the predictive failure information in the common storage. If the predictive failure information indicates that the resource may perform the requested function, the requesting computer system issues the request to the resource. In a second embodiment, one or more network protocols for communicating between computer systems on the network are modified so that messages given in response to resource requests include the predictive failure status of the requested system. Thus, if a requester needs data from another computer system, a message returned from that system in response to the request preferably includes predictive failure status or information indicating whether or not the request can be granted. If the predictive failure status or information indicates that the request can be granted, the requester performs the operation on the requested computer system. In this manner, predictive failure information can be used in granting access to resources between computer systems on a network, which allows accesses to be prevented if the predictive failure information indicates that the resource is likely to fail before completing the request.

34 Claims, 9 Drawing Sheets

| Returned from Prior Art ruptime command |   |
|---|---|
| hostname | 910 |
| status | 912 |
| load average | 914 |
| time | 916 |
| number of users | 918 |

FIG. 9

| Returned from new ruptime command |   |
|---|---|
| hostname | 910 |
| status | 912 |
| load average | 914 |
| time | 916 |
| number of users | 918 |
| predictive failure warning | 1010 |

FIG. 10

APPARATUS AND METHOD FOR SHARING PREDICTIVE FAILURE INFORMATION ON A COMPUTER NETWORK

BACKGROUND OF THE INVENTION

1. Technical Field

This invention generally relates to data processing, and more specifically relates to apparatus and methods for predicting failures in computer systems.

2. Background Art

Electronics and computers have greatly enhanced worker productivity in our modern information age. Much attention and many resources have been directed to making electronic and computer systems more reliable. When an electronic component or system fails, it can lead to system-wide failures that can cost companies millions of dollars. In such a context, it became necessary to prevent system failures.

Early attempts at preventative maintenance simply replaced certain components after a specified period of time in use. While this approach is effective if the time periods are selected with care, it is also very expensive, and leads to replacing components that do not need to be replaced. Some individual components can perform without problems for much longer than the mean time of operation without failures. By replacing components that do not need to be replaced, the cost of maintenance becomes excessive.

Another approach to preventative maintenance is to monitor components and replace a component when its operating parameters indicate that it may fail soon. This approach was pioneered by IBM in the early 1900s, and led to a concept referred to as Predictive Failure Analysis (PFA). Predictive failure analysis was first applied to hard disk drives. PFA status is in a normal state when the disk drive is operating correctly, and is in a "tripped" state when the PFA in the drive indicates that a failure will occur soon. A hard drive that has PFA capability monitors its internal functions, and indicates when the functions are outside of predefined limits by "tripping" a signal that indicates that the disk drive is about to fail. For example, a PFA status may be tripped if the fly height of a head is outside of specified limits, or if the error rate in the hard disk drive exceeds a specified limit. By indicating via the PFA status on a disk drive that a failure will likely happen soon, the system administrator has enough time to copy the contents of the disk drive to a backup source, replace the drive, and write the data from the backup to the new drive. PFA is thus an important tool that allows replacing a disk drive that may fail soon without loss of data.

Recognizing the value of predicting failures in disk drives, some competitors of IBM have implemented disk drives that have a S.M.A.R.T. interface, which stands for Self Monitoring And Reporting Technology. The S.M.A.R.T. interface is a specification of a set of registers in a device that contains information relating to the device's operation. No details are provided regarding the specific types of measurements that should be made or the values that indicate an impending failure. For this reason S.M.A.R.T. compatible disk drives are much less sophisticated that IBM disk drives that include Predictive Failure Analysis.

Predictive Failure Analysis has been implemented into components such as disk drives and printers. Thus, communication of information relating to predicted failures has been limited so far to the box-level of a computer system, which means that a component inside a computer reports predictive failure information within its own box, but this information has not been used or communicated outside of a particular computer system. With the popularity of computer networks, it would be useful to share predictive failure analysis information between computer systems on a network. Without an apparatus and method for communicating predictive failure information between computer systems on a computer network, the computer industry will continue to suffer from predictive failure information that is isolated within a system, with the result that failures that were predicted in individual systems may cause errors in inter-system communications over the network.

DISCLOSURE OF INVENTION

According to the preferred embodiments, an apparatus and method shares predictive failure information between computer systems in a computer network. The shared predictive failure information allows a requester of a network resource to determine whether the resource will be available to perform the request based on its predictive failure information. According to a first embodiment, predictive failure information is written by each computer system on the network to a common storage that is accessible by one or more other computer systems on the network. When a computer system on the network needs a resource on another system, the requesting computer system can check the predictive failure status of the system that contains the needed resource by reading the predictive failure information in the common storage. If the predictive failure information indicates that the resource may perform the requested function, the requesting computer system issues the request to the resource. In a second embodiment, one or more network protocols for communicating between computer systems on the network are modified so that messages given in response to resource requests include the predictive failure status of the requested system. Thus, if a requester needs data from another computer system, a message returned from that system in response to the request preferably includes predictive failure status or information indicating whether or not the request can be granted. If the predictive failure status or information indicates that the request can be granted, the requester performs the operation on the requested computer system. In this manner, predictive failure information can be used in granting access to resources between computer systems on a network, which allows accesses to be prevented if the predictive failure information indicates that the resource is likely to fail before completing the request.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 9 is a block diagram showing the information returned when a prior art ruptime command is issued; and FIG. 10 is a block diagram showing the information returned (including predictive failure information) when a new ruptime command in accordance with the preferred embodiments is issued.

BEST MODE FOR CARRYING OUT THE INVENTION

The present invention is accomplished through sharing predictive failure information between systems that are connected on a network. For those who are not familiar with networking concepts, the brief overview below provides background information that will help the reader to understand the present invention.

1. Overview

Networked Computer Systems

Connecting computers together on a network requires some form of networking software. Over the years, the power and sophistication of networking software has greatly increased. Networking software typically defines a protocol for exchanging information between computers on a network. Many different network protocols are known in the art. Examples of commercially-available networking software is Novell Netware and Windows NT, which each implement different protocols for exchanging information between computers.

One significant computer network that has recently become very popular is the Internet. The Internet grew out of a proliferation of computers and networks, and has evolved into a sophisticated worldwide network of computer systems. Using the Internet, a user may access computers all over the world from a single workstation. TCP/IP (Transmission Control Protocol/Internet Protocol) is an example of a network protocol that is in wide use today for communicating between computers on the Internet. In addition, the use of TCP/IP is also rapidly expanding to more local area networks (LANs) and Intranets within companies.

Another popular network protocol for perform administration tasks on a computer network is Simple Network Management Protocol (SNMP). Network protocols allow computers on a network to communicate together using predefined formats for messages that are passed back and forth on the network.

2. Detailed Description

According to preferred embodiments of the present invention, an apparatus and method communicate predictive failure information relating to one system on a network to another system on the network. By communicating predictive failure information between systems on a network, a system that requests a resource on another system can determine whether the resource will be available to fill the request.

Figure 1:
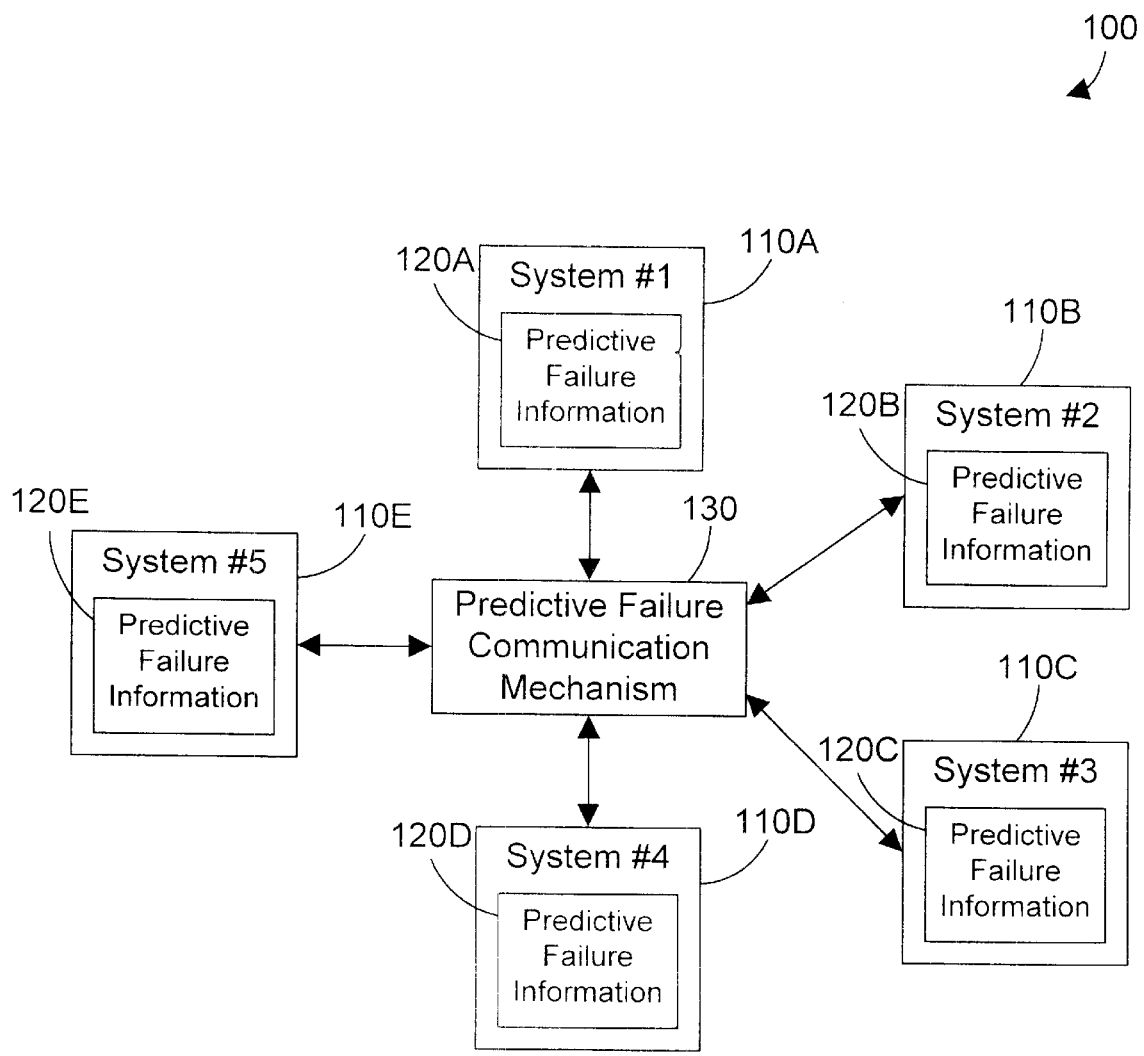
FIG. 1 is a logical block diagram of computer systems on a network that communicate their predictive failure information to other systems on the network.

Referring now to FIG. 1, a networked computer system 100 includes several different computer systems 110A–110E that each have corresponding predictive failure information 120A–120E. A predictive failure communication mechanism 130 is logically coupled to each computer system 110A–110E, and provides a way to share the predictive failure information 120A–120E on each system with other systems on the network. Note that FIG. 1 represents a logical connection between the predictive failure communication mechanism 130 and the computer systems 110A–110E on the network, and this logical connection could be achieved by virtually any physical computer network arrangement, whether now known or developed in the future.

Each system 110 in the preferred embodiments can be a full-blown computer system, such as an IBM personal computer (PC), or can be any other type of component or device that can communicate predictive failure information on a network. For example, some printers have network interfaces, and a printer would thus be one suitable type of "system" 110 referred to in FIG. 1. The preferred embodiments extend to any type of device that can communicate predictive failure information on a network, whether incorporated into a system or existing independent of other systems.

The predictive failure information 120 in FIG. 1 can take on a number of different forms. In one example, predictive failure information 120 comprises a list of performance parameters for a system 110 or for a component within a system 110. In this case, predictive failure communication mechanism 130 knows the acceptable ranges for the performance parameters, and determines when the performance parameters that comprise the predictive failure information 120 are within the acceptable ranges. In another example, predictive failure information 120 comprises a status message that indicates whether a predictive failure mechanism in the corresponding system has "tripped" or not. In this configuration, each system (or component) knows the acceptable ranges for performance parameters, and a predictive failure status that is "tripped" indicates that the performance parameters are outside of their acceptable ranges (meaning that a predictive failure may occur soon), while a status that is "not tripped" indicates that performance parameters for the system or component are within acceptable ranges (meaning that there is no indication of a predictive failure).

Predictive failure information 120 can also communicate predictive failure information at numerous different levels of granularity. For example, a single system may have ten different subsystems that each have corresponding predictive failure information. The predictive failure information 120 in this example could take on a number of different forms. For example, the predictive failure information relating to each subsystem could be written to a common file or data storage, which comprises the predictive failure information 120 for the system. In the alternative, the predictive failure information for all ten subsystems may be represented by a "tripped" or "not tripped" status, and the predictive failure information 120 for the system would thus show "tripped" if any of the predictive failure information for the ten subsystems indicate "tripped". In still another example, the predictive failure information 120 may simply indicate "not tripped" for the subsystems that are not tripped, but may include more detailed information for a subsystem if and when it trips.

This concept of granularity is important to understanding the various different modes of operation that are included within the scope of the preferred embodiments. For example, let's assume that the predictive failure information 120 for a selected system indicates "tripped" if any of its subsystems have tripped, and indicates "not tripped" if and only if all subsystems have not tripped. In this situation, if another computer system on the network requests a resource on this selected computer system (such as data), the predictive failure information 120 could simply indicate that the system is unavailable for the data transfer. In an alternative embodiment, predictive failure information 120 may indicate for how long the subsystem that "tripped" will be available, and if the subsystem will be available for a sufficient period of time to assure that the requested operation can be completed, the operation could then be allowed. In another alternative embodiment, the subsystem that "tripped" may not be the subsystem that is required to fill the resource request. For example, predictive failure information in a display subsystem may not affect the transfer of data, but is still present to indicate when the display system may need maintenance. In this example, the predictive failure information could indicate to the requesting system that the resource it needs is available even though another subsystem's predictive failure information has "tripped". We see from these examples presented above that there are numerous different options for communicating predictive failure information between systems on a network, and the preferred embodiments expressly extend to any and all options, whether now existing or developed in the future.

Figure 2:
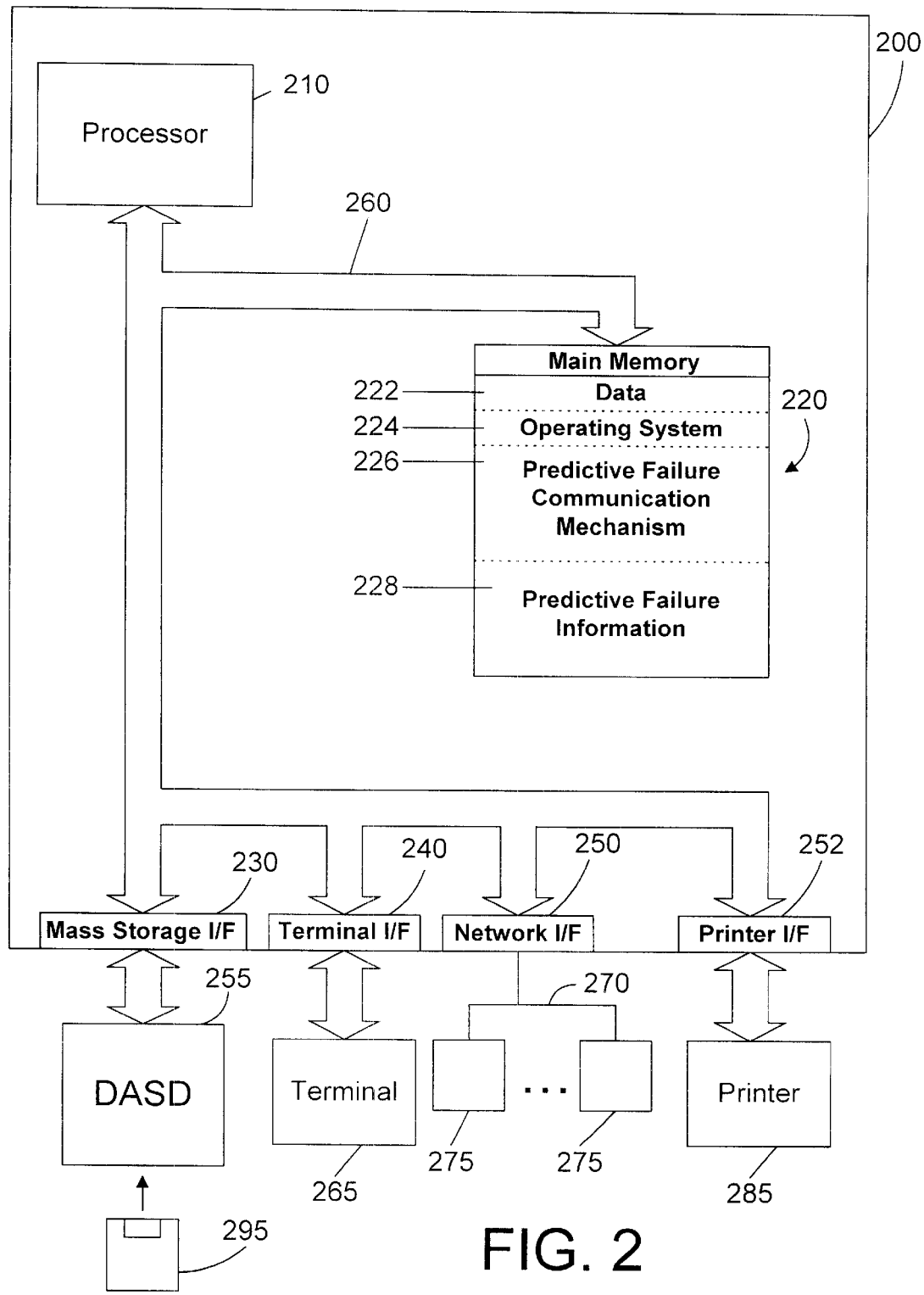
FIG. 2 is a block diagram of a particular computer system that may communicate its predictive failure information to other computer systems on a network.

Referring now to FIG. 2, a computer system 200 is an enhanced IBM AS/400 computer system, and represents one suitable type of system (e.g., 110A–110E of FIG. 1) that can be networked together in accordance with the preferred embodiments. As shown in FIG. 2, computer system 200 comprises a processor 210 connected to a main memory 220, a mass storage interface 230, a terminal interface 240, a network interface 250, and a printer interface 252. These system components are interconnected through the use of a system bus 260. Mass storage interface 230 is used to connect mass storage devices (such as a direct access storage device 255) to computer system 200. One specific type of direct access storage device 255 is a floppy disk drive, which may store data to and read data from a floppy diskette 295.

Main memory 220 contains data 222, an operating system 224, a predictive failure communication mechanism 226, and predictive failure information 228. Data 222 represents any data that serves as input to or output from any program in computer system 200. Operating system 224 is a multitasking operating system known in the industry as OS/400; however, those skilled in the art will appreciate that the spirit and scope of the present invention is not limited to any one operating system. Predictive failure communication mechanism 226 provides a way to communicate predictive failure information 228 to other computer systems (e.g., 275) that are coupled via a network 270 to computer system 200. While a predictive failure communication mechanism 130 is shown in FIG. 1 to logically couple different computer systems on a network, one implementation of mechanism 130 in FIG. 1 has a local predictive failure communication mechanism 226 on one or more systems on the network, as shown in FIG. 2. The preferred embodiments expressly extend to any mechanism for sharing predictive failure information 228 between systems on a network.

Predictive failure information 228 comprises any form of information that may indicate, in whole or in part, whether a system or component may fail. In the preferred embodiment, predictive failure information 228 comprises a "tripped" or "not tripped" status that indicates whether or not a predictive failure warning has been generated. Note, however, that predictive failure information 228 may take on any other suitable form that is representative of data, status, or other information regarding the predictive failure of a component or system. Note that predictive failure information 228 may be representative of any component or combination of components in a system. Thus, predictive failure information 228 could contain predictive failure information relating to, for example, DASD 255, printer 285, processor 210, etc. In the preferred embodiments, predictive failure information 228 is written to main memory 220 by processor 210 via system bus 260, and could thus be derived in whole or in part from any device or interface coupled to system bus 260.

Computer system 200 utilizes well known virtual addressing mechanisms that allow the programs of computer system 200 to behave as if they only have access to a large, single storage entity instead of access to multiple, smaller storage entities such as main memory 220 and DASD device 255. Therefore, while data 222, operating system 224, predictive failure communication mechanism 226, and predictive failure information 228 are shown to reside in main memory 220, those skilled in the art will recognize that these items are not necessarily all completely contained in main memory 220 at the same time. It should also be noted that the term "memory" is used herein to generically refer to the entire virtual memory of computer system 200.

Processor 210 may be constructed from one or more microprocessors and/or integrated circuits. Processor 210 executes program instructions stored in main memory 220. Main memory 220 stores programs and data that processor 210 may access. When computer system 200 starts up, processor 210 initially executes the program instructions that make up operating system 224. Operating system 224 is a sophisticated program that manages the resources of computer system 200. Some of these resources are processor 210, main memory 220, mass storage interface 230, terminal interface 240, network interface 250, printer interface 252, and system bus 260.

Although computer system 200 is shown to contain only a single processor and a single system bus, those skilled in the art will appreciate that the present invention may be practiced using a computer system that has multiple processors and/or multiple buses. In addition, the interfaces (called input/output processors in AS/400 terminology) that are used in the preferred embodiment each include separate, fully programmed microprocessors that are used to off-load compute-intensive processing from processor 210. However, those skilled in the art will appreciate that the present invention applies equally to computer systems that simply use I/O adapters to perform similar functions.

Terminal interface 240 is used to directly connect one or more terminals 265 to computer system 200. These terminals 265, which may be non-intelligent (i.e., dumb) terminals or fully programmable workstations, are used to allow system administrators and users to communicate with computer system 200. Note, however, that while terminal interface 240 is provided to support communication with one or more terminals 265, computer system 200 does not necessarily require a terminal 265, because all needed interaction with users and other processes may occur via network interface 250.

Network interface 250 is used to connect other computer systems and/or workstations (e.g., 275 in FIG. 2) to computer system 200 across a network 270. Network 270 represents the logical connections between computer system 200 and other computer systems on the network 270. The present invention applies equally no matter how computer system 200 may be connected to other systems, regardless of whether the network connection 270 is made using present-day analog and/or digital techniques or via some networking mechanism of the future. In addition, many different network protocols can be used to implement a network. As discussed in the Overview section, these protocols are specialized computer programs that allow computers to communicate across network 270. TCP/IP (Transmission Control Protocol/Internet Protocol) is an example of a suitable network protocol.

Printer interface 252 is used to send information to be printed to printer 285. As stated in the Background section, known mechanisms for generating predictive failure information been implemented for hard disk drives and for printers. Predictive failure information 228 may be indicative of any component within system 200 or coupled to system 200, including printer 285.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 295 of FIG. 2) and CD ROM, and transmission type media such as digital and analog communications links.

Figure 3:
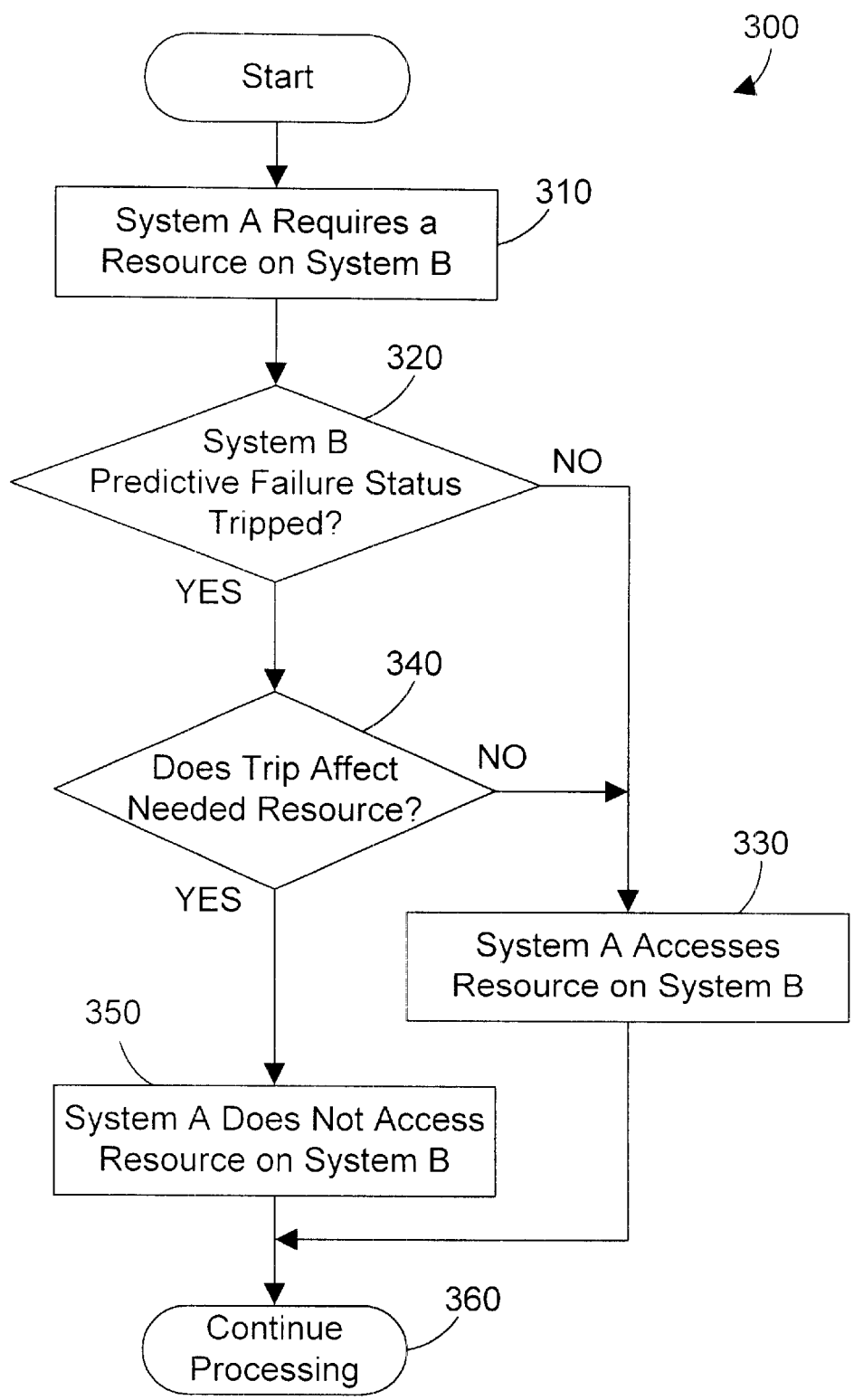
FIG. 3 is a flow diagram of a method for using predictive failure information when granting access to resources between computer systems on a computer network in accordance with the preferred embodiments.

Referring to FIG. 3, a method 300 in accordance with the preferred embodiments of the present invention begins when one system, denoted System A, requires a resource on another system, denoted System B, on the network (step 310). For this example, we assume that predictive failure information includes a predictive failure status that is either "tripped" to indicate that the performance parameters for the resource or system lie outside their acceptable limits, or "not tripped" to indicate normal operation. If the predictive failure status on system B is not tripped (step 320=NO), system A may then access the resource on system B (step 330). If the predictive failure status on system B is tripped (step 320=YES), method 300 then determines whether the tripped predictive failure status affects the request for the resource on system B (step 340). In the example above, a tripped predictive failure status in a display subsystem probably would not affect the request for data on a hard disk drive in the same system, so the data request could be honored even though the predictive failure on the system has tripped. If the tripped predictive failure status does not affect the needed resource (step 340=NO), system A accesses the needed resource on system B (step 330). If the tripped predictive failure status does affect the needed resource (step 340=YES), then system A is not allowed to access the resource on system B (step 350). At this point, normal processing continues (step 360). Note that step 340 is optional. If step 340 is omitted, when the predictive failure status of system B is tripped (step 320=YES), system A does not access the requested resource on system B (step 350).

Figure 4:
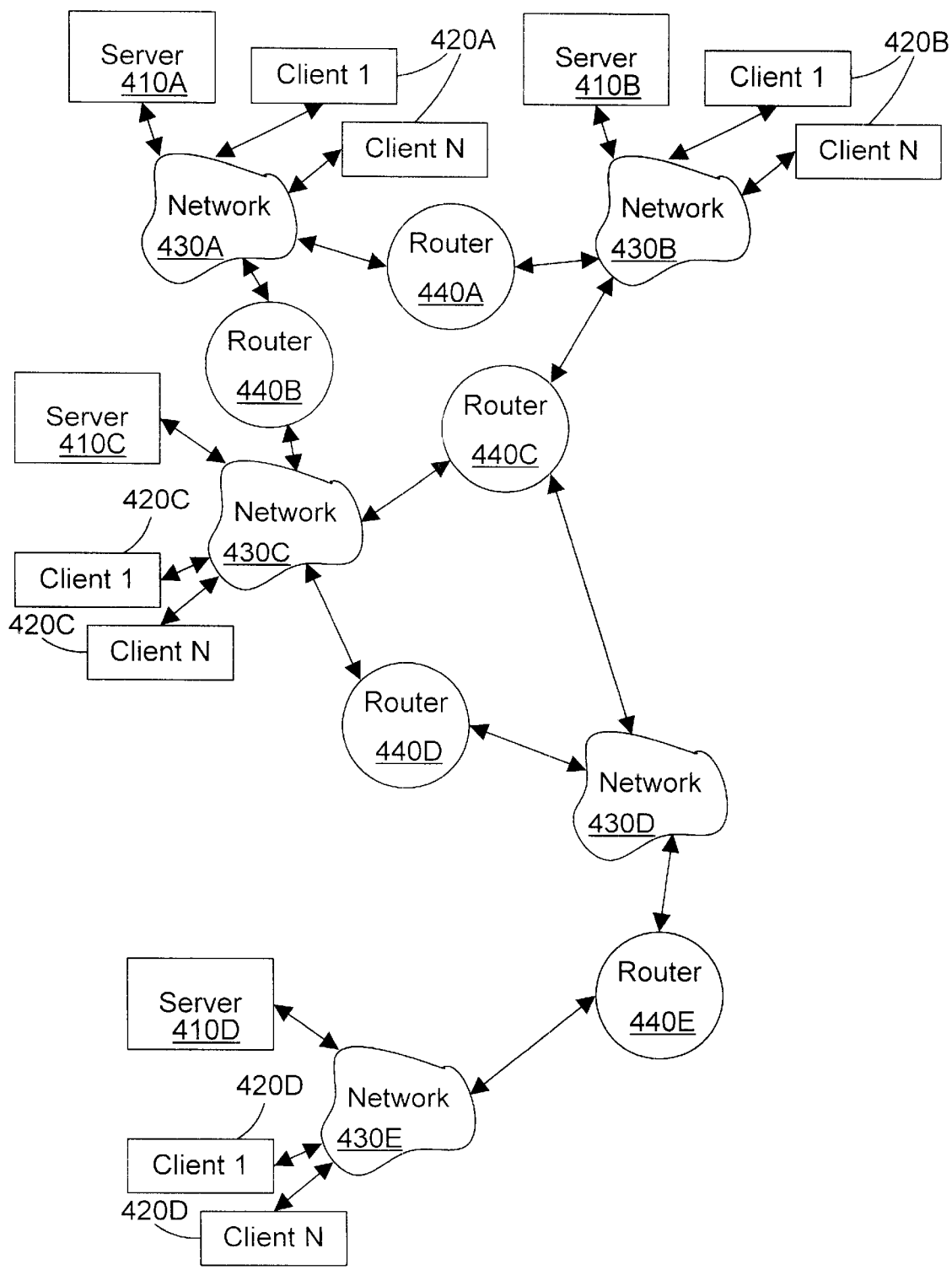
FIG. 4 is a block diagram of a sample network configuration for illustrating the concepts of the preferred embodiments.

A sample network configuration 400 is shown in FIG. 4 for the purpose of illustrating the concepts of the preferred embodiments. A first network 430A is shown that couples together a server 410A and multiple clients 420A to two routers 440A and 440B. In similar fashion, networks 430B, 430C, and 430E are each coupled to respective servers 410, clients 420, and routers 440 as shown. Another network 430D is shown without a server or clients. The sample network configuration of FIG. 4 is shown to illustrate that a variety of different network configurations can exist, all of which are within the scope of the preferred embodiments.

Figure 5:
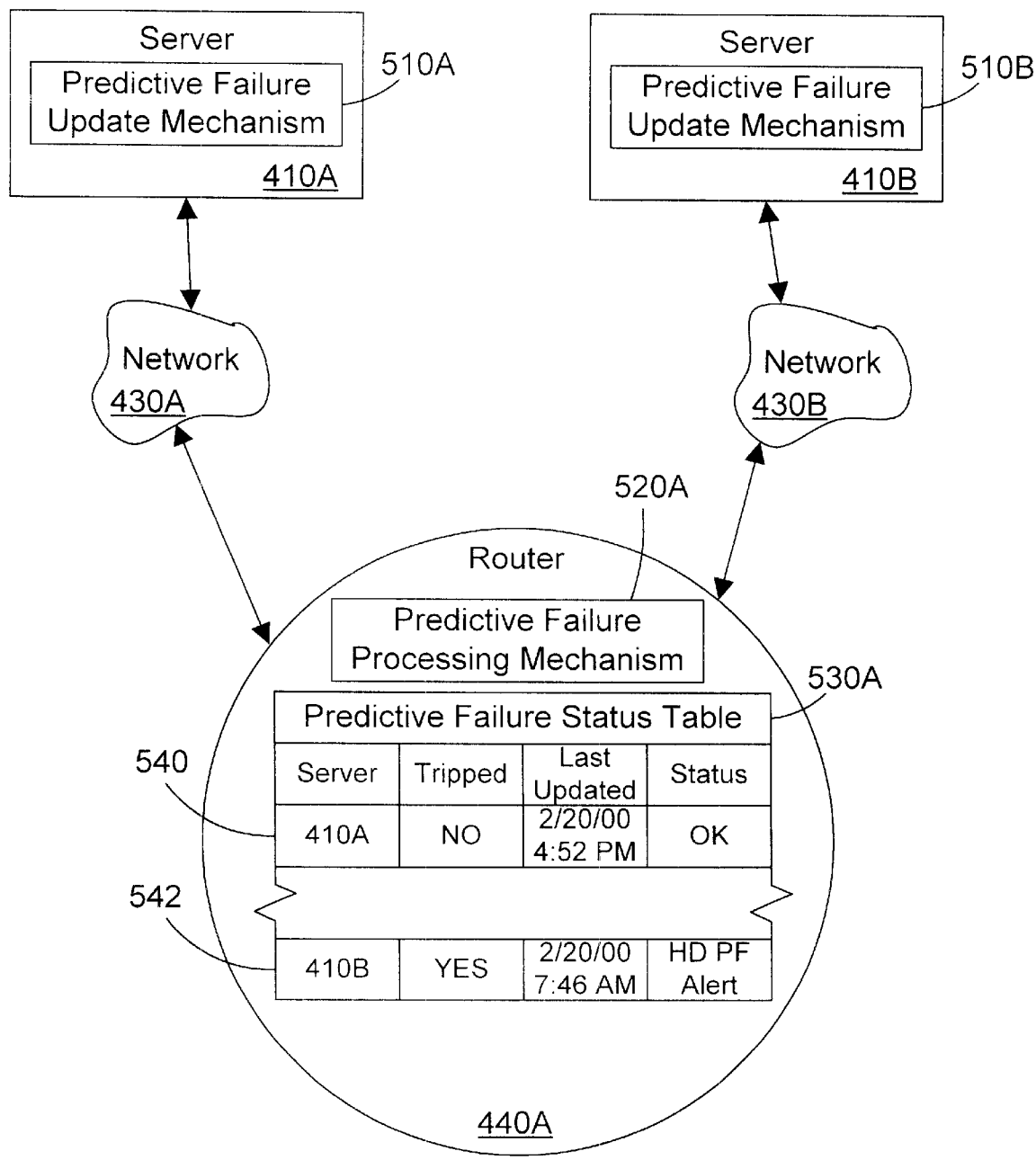
FIG. 5 is a block diagram of a portion of the sample network configuration in FIG. 4 showing an implementation in accordance with a first embodiment of the invention.

Referring now to FIG. 5, portions of the network diagram of FIG. 4 are shown in more detail to show one specific implementation in accordance with a first embodiment of the invention. We assume for this first embodiment that a predictive failure status table 530A is defined within router 440A for each system coupled to it. In this particular example, server 410A and server 410B are both coupled to router 440A through their respective networks 430A and 430B. As a result, predictive failure status table 530A includes an entry 540 for server 410A and an entry 542 for server 410B. Note that the entries each specify whether the predictive failure status for the corresponding server is tripped or not, when the predictive failure status was last updated, and any additional status information that may be needed. Thus, entry 540 indicates that the predictive failure status for server 410A is not tripped, that this status was last updated on Feb. 20, 2000 at 4:52 PM, and that the status is OK (because the predictive failure status is not tripped). Entry 542 indicates that the predictive failure status for server 410B is tripped, that the predictive failure information was last updated on Feb. 20, 2000 at 7:46 AM, and that the predictive failure status tripped due to a hard disk predictive failure alert. Of course, the information contained within the predictive failure status table 530A can vary from that shown. Predictive failure status table 530A is one specific implementation, and the first preferred embodiment expressly includes any common storage that can be accessed by two or more systems on the network for determining the predictive failure status of another system on the network The entries within predictive failure status table 530A are periodically updated by the predictive failure update mechanism 510A in each system writing its predictive failure status to the appropriate entry. A predictive failure processing mechanism 520A can then determine from the entries whether a request for a resource on server 410A or, 410B can be honored based on the corresponding entries in the predictive failure status table. In the alternative, a system (such as server 410A) could include a predictive failure processing mechanism that reads the predictive failure status of another system from the common storage (e.g., the predictive failure status table 530A) before requesting a resource, to determine whether or not the resource can honor the request.

Figure 6:
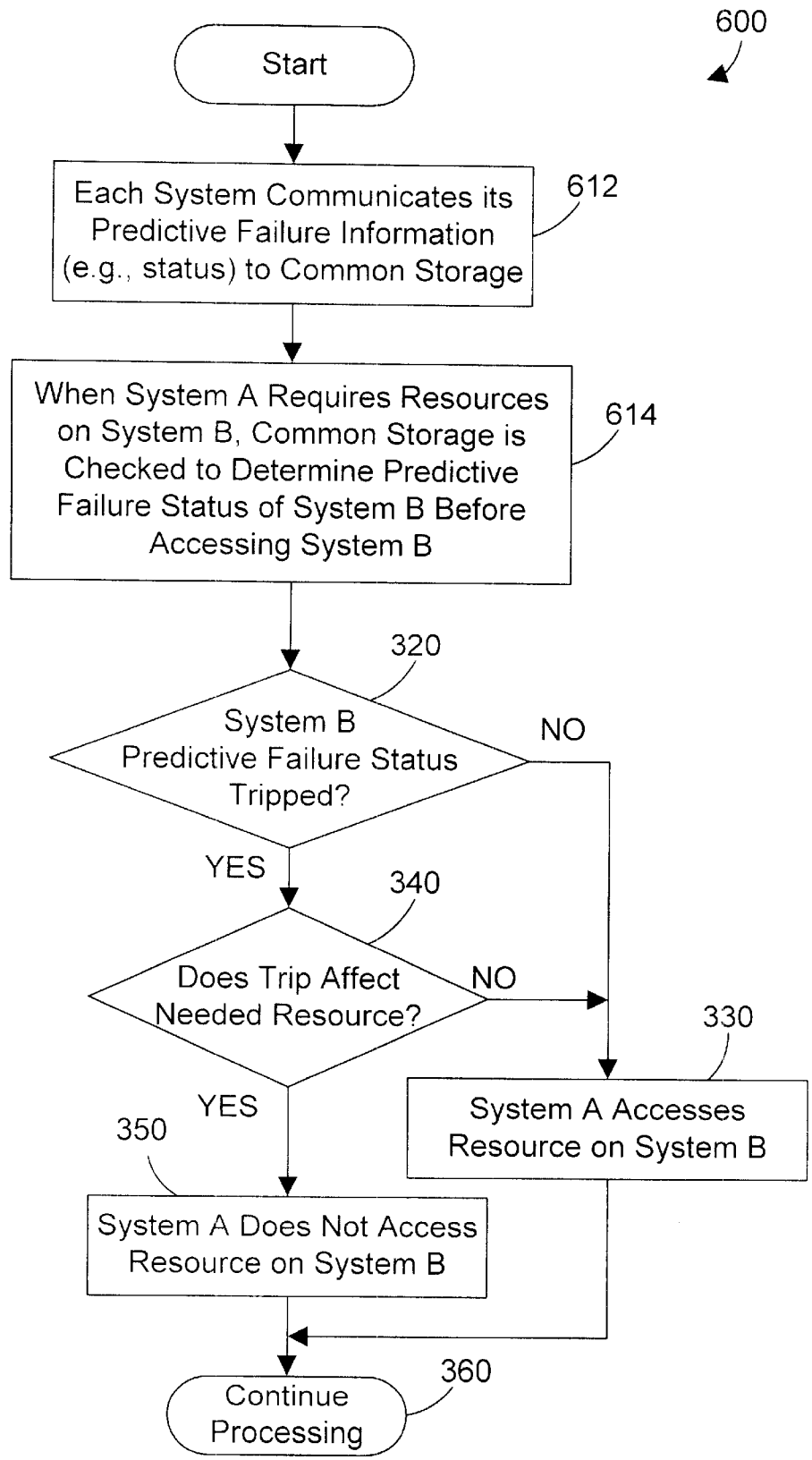
FIG. 6 is a flow diagram that shows the steps performed in a method in accordance with the first embodiment.

Referring to FIG. 6. a method 600 illustrates the steps in accordance with the first embodiment as illustrated by the example in FIG. 5. Note that method 600 is simply an implementation-specific method for carrying out the more general steps of method 300 in FIG. 3. Each system communicates its predictive failure information or status to common storage (step 612). In FIG. 5, this step is carried out by the predictive failure update mechanisms 510A and 510B writing the predictive failure information and/or status for their respective systems 410A and 410B to the appropriate entries in predictive failure status table 530A. Next, when a system, denoted System A, requires resources from another system, denoted System B. the common storage is checked to determine the predictive failure status of system B before accessing the requested resource in system B (step 614). This checking instep 614 can be performed by the requesting system (system A), or can be preformed by a mechanism external to system A (such as predictive failure processing mechanism 520A in FIG. 5). At this point the predictive failure status of system B is known, and the flow in steps 320, 330, 340, 350 and 360 are as described above with reference to FIG. 3.

Figure 7:
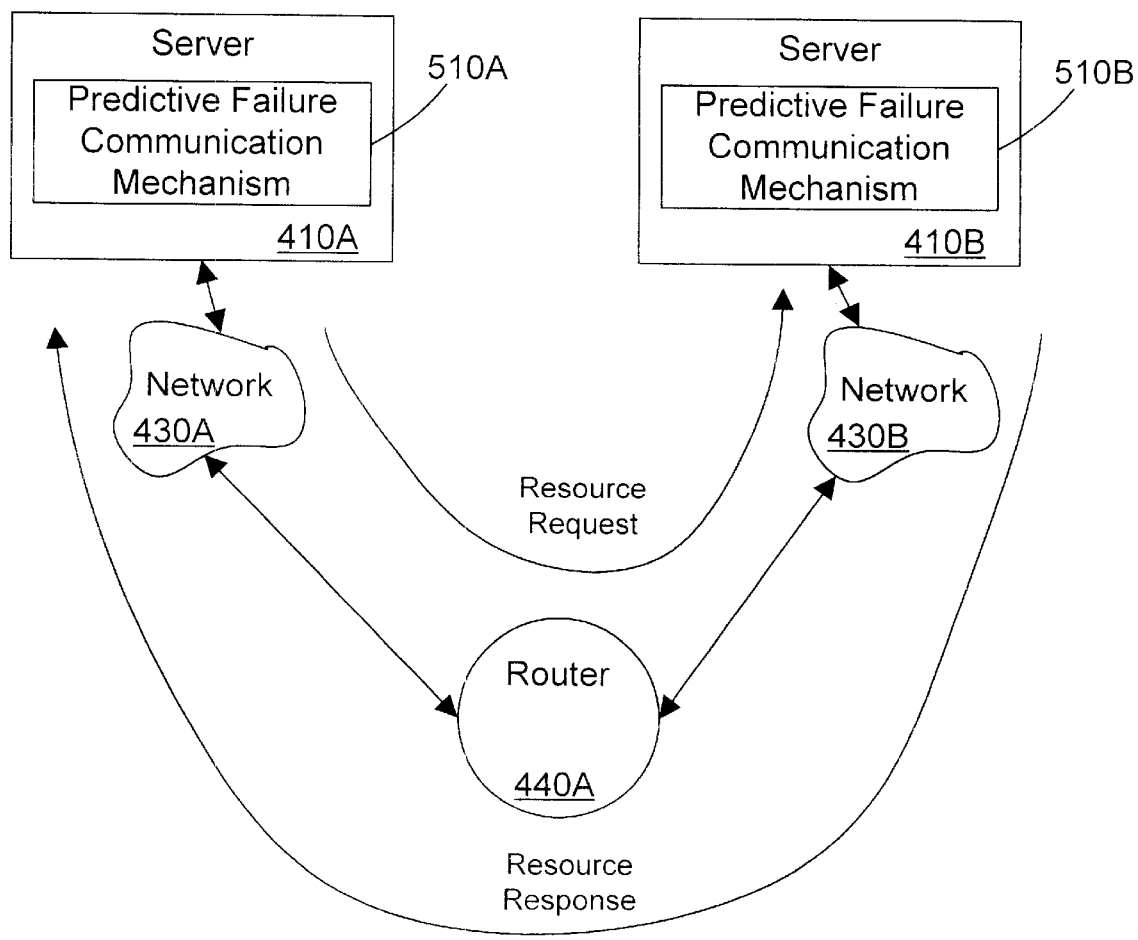
FIG. 7 is a block diagram of a portion of the sample network configuration in FIG. 4 showing an implementation in accordance with a second embodiment of the invention.

A second embodiment of the invention uses network messages to communicate predictive failure information between systems. One specific implementation of such a system is shown in FIG. 7. Systems 410A and 410B each include respective predictive failure communication mechanisms 510A and 510B. When a resource is requested via a network message, the response to the request preferably includes information regarding the predictive failure information or status for the system or resource being requested. For example, when server 410A performs a request for a resource on server 410B, the message goes through network 430A and router 440A to network 430B to server 410B. The predictive failure communication mechanism 510B in server 410B responds to the request with a message that includes information relating to the predictive failure information or status of server 410B. In this manner server 410A can determine whether a resource on server 410B is available without performing any dedicated requests on the network relating to predictive failure information.

Figure 8:
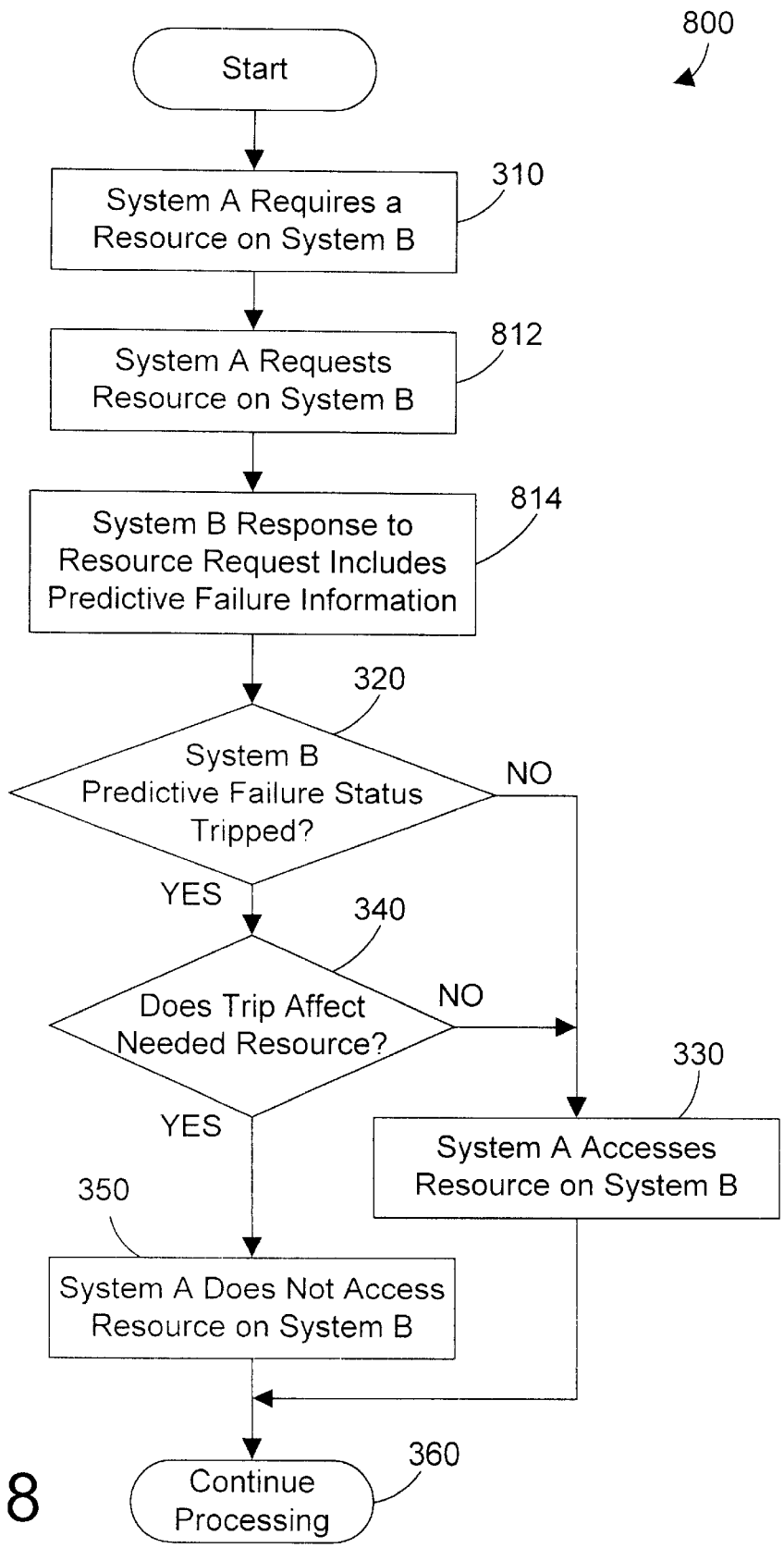
FIG. 8 is a flow diagram that shows the steps performed in a method in accordance with the second embodiment.

FIG. 8 illustrates a method 800 in accordance with the second embodiment as illustrated by the example in FIG. 7. As was the case for method 600, method 800 is also a more detailed implementation of the more general method 300 in FIG. 3. Method 800 begins when one system (system A) requires a resource on another system (system B) (step 310). System A then requests the resource on system B (step 812). In response, system B responds to the request with a message that includes predictive failure information or status (step 814). At this point steps 320, 330, 340, 350 and 360 are the same as shown and discussed with reference to method 300 in FIG. 3.

A specific example of how a network message can be modified to include predictive failure information is now presented. Let's assume that two different servers that are coupled together on a network need to communicate with each other. We assume that these servers communicate via TCP/IP, which means that each server has its own unique TCP/IP address. We assume that both servers are running a special program called rwhod daemon, which is a computer program that responds to two specific TCP/IP commands, namely rwho and ruptime. The prior art format for a response to the ruptime command is shown in FIG. 9, and includes a specification of host name 910, status 912, load average 914, time 916, and number of users 918. Those familiar with networking and with TCP/IP will be familiar with the rwhod daemon and the ruptime command. Referring now to FIG. 10, the rwhod daemon in accordance with the second embodiment is modified to provide a predictive failure warning 1010 in addition to the prior art portions shown in FIG. 9. In this way, the status of a system is augmented to include predictive failure information. Note that the second embodiment provides an advantage over the first embodiment because the second embodiment piggybacks onto an existing message, which means that no special commands are needed to share predictive failure information. As a result, network traffic is not significantly increased by changing an existing network command to include predictive failure information.

Use of the ruptime command is generally suitable only for local machines on a network. In order to cross between different networks via routers, the simple network management protocol (SNMP) is better suited. SNMP is the standard TCP/IP network management protocol. SNMP operates via simple "get" and "put" commands that access data on routers. SNMP permits obtaining the status and control of routers. The information that must be maintained by routers and which can or cannot be altered is defined in a standard known as the Management Information Base (MIB). There are several MIB categories that could be relevant for predictive failure information. These include individual network interfaces, Internet control message protocol, or transmission control protocol. In one embodiment of the invention using SNMP, another category is added to the MIB called "Internet predictive failure protocol". One advantage of the MIB is that it is separate from the network management protocol so that different networks running their own SNMP that includes predictive failure information can interoperate with other networks running SNMP.

A simple example is now presented that illustrates the usefulness of sharing predictive failure information on a network. Referring to FIG. 2, we assume that predictive failure information is generated for printer 285, and stored in main memory as predictive failure information 228. Predictive failure communication mechanism 226 can then make this information regarding the printer available to other systems (e.g., 275) on the network. By sharing predictive failure information regarding the printer, a different system can determine whether the printer might fail before completing a particular print job. Let's assume for the sake of example that the predictive failure information includes information regarding the number of pages the printer can print based on the amount of remaining paper and toner. If we assume that a different system wants to print to printer 285, it can first determine from the predictive failure information 228 whether or not the printer can handle the particular print job without running out of paper or toner. If the predictive failure information for the printer indicates that the print job is larger than the expected number of pages that can be successfully printed, the print job could then be routed to a different printer on the network.

The present invention as described with reference to the preferred embodiments herein provides significant improvements over the prior art. Predictive failure information is no longer constrained to the box level, but can now be shared with other systems on the network. By sharing predictive failure information on a network, a more robust networked computer system results because failures or data losses that might occur due to predicted failures can be avoided by first checking the predictive failure information or status of a system before using a resource on that system.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

I claim:

1. An apparatus comprising:
   a plurality of computer systems coupled together via a network, wherein at least one of the computer systems includes corresponding predictive failure information;
   a common storage accessible by the plurality of computer systems, the common storage containing predictive failure information for at least one of the plurality of computer systems; and
   a predictive failure communication mechanism coupled to the network that accesses the predictive failure information in the common storage to determine whether a selected computer system on the network is able to service a request for a resource on the selected computer system.

2. The apparatus of claim 1 wherein the predictive failure information indicates whether at least one component on the corresponding computer system will likely fail within a specified time.

3. The apparatus of claim 1 wherein the predictive failure information includes performance information for at least one component on the corresponding computer system.

4. The apparatus of claim 1 wherein the predictive failure information indicates whether a resource on the corresponding computer system is capable of fulfilling a request from another computer system on the network.

5. The apparatus of claim 1 wherein the predictive failure information indicates a "not tripped" status if the predictive failure information on the corresponding computer system lies within predefined limits, and indicates a "tripped" status if the predictive failure information on the corresponding computer system lies outside of the predefined limits.

6. An apparatus comprising:
   a plurality of computer systems coupled together via a network, wherein at least one of the computer systems includes corresponding predictive failure information; and
   a predictive failure communication mechanism that communicates the predictive failure information to at least one other computer system on the network in a message in a network protocol for communication between computer systems on the network, wherein the message is sent in response to one computer system requesting a resource on a different computer system on the network.

7. The apparatus of claim 6 wherein the predictive failure information indicates whether at least one component on the corresponding computer system will likely fail within a specified time.

8. The apparatus of claim 6 wherein the predictive failure information includes performance information for at least one component on the corresponding computer system.

9. The apparatus of claim 6 wherein the predictive failure information indicates whether a resource on the corresponding computer system is capable of fulfilling a request from another computer system on the network.

10. The apparatus of claim 6 wherein the predictive failure information indicates a "not tripped" status if the predictive failure information on the corresponding computer system lies within predefined limits, and indicates a "tripped" status if the predictive failure information on the corresponding computer system lies outside of the predefined limits.

11. A computer-implemented method for sharing predictive failure information among a plurality of computer systems coupled together on a network, the method comprising the steps of:
   determining predictive failure information for at least one component on a selected one of the plurality of computer systems;
   the selected computer system writing the predictive failure information to a common storage; and
   another of the plurality of computer systems reading the predictive failure information of the selected computer system from the common storage.

12. The method of claim 11 wherein the predictive failure information indicates whether at least one component on the corresponding computer system will likely fail within a specified time.

13. The method of claim 11 wherein the predictive failure information includes performance information for at least one component on the corresponding computer system.

14. The method of claim 11 wherein the predictive failure information indicates whether a resource on the corresponding computer system is capable of fulfilling a request from another computer system on the network.

15. The method of claim 11 wherein the predictive failure information indicates a "not tripped" status if the predictive failure information on the corresponding computer system lies within predefined limits, and indicates a "tripped" status if the predictive failure information on the corresponding computer system lies outside of the predefined limits.

16. A computer-implemented method for sharing predictive failure information among a plurality of computer systems coupled together on a network, the method comprising the steps of:
   determining predictive failure information for at least one component on a first of the plurality of computer systems;
   a second of the plurality of computer systems requesting a resource on the first computer system; and
   in response to the second computer system requesting a resource on the first computer system, the first computer system returning a message to the second computer system, wherein the message includes predictive failure information for the first computer system.

17. The method of claim 16 wherein the predictive failure information indicates whether at least one component on the corresponding computer system will likely fail within a specified time.

18. The method of claim 16 wherein the predictive failure information includes performance information for at least one component on the corresponding computer system.

19. The method of claim 16 wherein the predictive failure information indicates whether a resource on the corresponding computer system is capable of fulfilling a request from another computer system on the network.

20. The method of claim 16 wherein the predictive failure information indicates a "not tripped" status if the predictive failure information on the corresponding computer system lies within predefined limits, and indicates a "tripped" status if the predictive failure information on the corresponding computer system lies outside of the predefined limits.

21. A program product comprising:
   (A) a predictive failure communication mechanism that accesses predictive failure information for a plurality of networked computer systems in a common storage accessible by the plurality of computer systems to determine whether a selected computer system on the network is able to service a request for a resource on the selected computer system; and
   (B) computer-readable signal bearing media bearing the predictive failure communication mechanism.

22. The program product of claim 21 wherein the signal bearing media comprises recordable media.

23. The program product of claim 21 wherein the signal bearing media comprises transmission media.

24. The program product of claim 21 wherein the predictive failure information indicates whether at least one component on the corresponding computer system will likely fail within a specified time.

25. The program product of claim 21 wherein the predictive failure information includes performance information for at least one component on the corresponding computer system.

26. The program product of claim 21 wherein the predictive failure information indicates whether a resource on the corresponding computer system is capable of fulfilling a request from another computer system on the network.

27. The program product of claim 21 wherein the predictive failure information indicates a "not tripped" status if the predictive failure information on the corresponding computer system lies within predefined limits, and indicates a "tripped" status if the predictive failure information on the corresponding computer system lies outside of the predefined limits.

28. A program product comprising:
(A) a predictive failure communication mechanism that communicates predictive failure information for a first computer system on a network to at least one other computer system on the network in a message in a network protocol for communication between computer systems on the network, wherein the message is sent in response to one computer system requesting a resource on the first computer system; and
(B) computer-readable signal bearing media bearing the predictive failure communication mechanism.

29. The program product of claim 28 wherein the signal bearing media comprises recordable media.

30. The program product of claim 28 wherein the signal bearing media comprises transmission media.

31. The program product of claim 28 wherein the predictive failure information indicates whether at least one component on the corresponding computer system will likely fail within a specified time.

32. The program product of claim 28 wherein the predictive failure information includes performance information for at least one component on the corresponding computer system.

33. The program product of claim 28 wherein the predictive failure information indicates whether a resource on the corresponding computer system is capable of fulfilling a request from another computer system on the network.

34. The program product of claim 28 wherein the predictive failure information indicates a "not tripped" status if the predictive failure information on the corresponding computer system lies within predefined limits, and indicates a "tripped" status if the predictive failure information on the corresponding computer system lies outside of the predefined limits.

* * * * *